United States Patent
Kim

(10) Patent No.: US 9,280,263 B2
(45) Date of Patent: Mar. 8, 2016

(54) MOBILE TERMINAL AND CONTROL METHOD THEREOF

(71) Applicant: Changmok Kim, Seoul (KR)

(72) Inventor: Changmok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 220 days.

(21) Appl. No.: 13/795,037

(22) Filed: Mar. 12, 2013

(65) Prior Publication Data

US 2014/0115455 A1    Apr. 24, 2014

(30) Foreign Application Priority Data

Oct. 23, 2012    (KR) .................... 10-2012-0118095

(51) Int. Cl.

| | |
|---|---|
| *G06F 3/048* | (2013.01) |
| *G06F 3/01* | (2006.01) |
| *G06F 3/0482* | (2013.01) |
| *G06F 1/16* | (2006.01) |
| *G06F 3/0488* | (2013.01) |
| *G06F 3/0481* | (2013.01) |
| *G06F 3/0484* | (2013.01) |

(52) U.S. Cl.
CPC ............ *G06F 3/0482* (2013.01); *G06F 1/1626* (2013.01); *G06F 3/04817* (2013.01); *G06F 3/04842* (2013.01); *G06F 3/04883* (2013.01); *G06F 3/04886* (2013.01); *G06F 2203/04808* (2013.01)

(58) Field of Classification Search
CPC .................... G06F 2203/04808; G06F 3/0482; G06F 3/04842; G06F 3/04886; G06F 3/04817
USPC .......................................... 715/767, 702, 772
See application file for complete search history.

(56) References Cited

U.S. PATENT DOCUMENTS

| | | | |
|---|---|---|---|
| 5,920,316 A * | 7/1999 | Oran et al. .................... 715/779 |
| 7,770,135 B2 * | 8/2010 | Fitzmaurice ................... 715/856 |
| 2006/0125803 A1 * | 6/2006 | Westerman ......... G06F 3/04883 345/173 |
| 2007/0136690 A1 * | 6/2007 | MacLaurin et al. .......... 715/822 |
| 2009/0287999 A1 * | 11/2009 | Ooi et al. ....................... 715/702 |
| 2010/0313125 A1 * | 12/2010 | Fleizach et al. ............... 715/702 |
| 2011/0209093 A1 * | 8/2011 | Hinckley et al. .............. 715/834 |
| 2012/0030566 A1 * | 2/2012 | Victor ............................. 715/702 |
| 2012/0098768 A1 * | 4/2012 | Bendewald ............ B60K 35/00 345/173 |
| 2012/0154313 A1 * | 6/2012 | Au ....................... G06F 3/04883 345/173 |
| 2012/0159398 A1 * | 6/2012 | Kurosawa et al. ............ 715/841 |
| 2012/0278762 A1 * | 11/2012 | Mouilleseaux et al. ...... 715/834 |
| 2014/0033032 A1 * | 1/2014 | Reynolds et al. ............. 715/702 |
| 2014/0075388 A1 * | 3/2014 | Kuscher et al. ............... 715/834 |

OTHER PUBLICATIONS

Definitions "drag", "drain", "icon", "indicator", "input", "input/output", "input/output device", "input/output interface", "stylus", "touch pad", "touch screen", "tap", "tap and hold"; MicrosoftComputer Dictionary, Microsoft Press, Print ISBN-13: 978-0-7356-1495-6, Mar. 15, 2002, pp. 223, 334, 342, 347-348, 631, 661, & 664.*

Definitions "continuous", "cue", "remove", "visual"; Collins English Dictinary, 1994 (Third updated edition) retrieved from the internet at http://search.credoreference.com/content/entry/hcengdict/ . . . on May 21, 2015.*

* cited by examiner

*Primary Examiner* — Steven Sax
*Assistant Examiner* — Wilson Varga
(74) *Attorney, Agent, or Firm* — KED & Associates LLP

(57) ABSTRACT

A mobile terminal capable of sensing a touch input, and a control method thereof are provided. The mobile terminal includes: a display unit configured to display screen information; a sensing unit configured to sense a touch input applied to the display unit; and a controller configured to display an indicator bar including at least one icon together with the screen information, and select any one of icons displayed in the indicator bar.

12 Claims, 17 Drawing Sheets

MOBILE TERMINAL AND CONTROL METHOD THEREOF

CROSS REFERENCE TO RELATED APPLICATIONS

Pursuant to 35 U.S.C. §119(a), this application claims the benefit of earlier filing date and right of priority to Korean Patent Application No. 10-2012-0118095, filed on Oct. 23, 2012, the contents of which are hereby incorporated by reference in its entirety.

BACKGROUND

1. Field of the Invention

The present invention relates to a mobile terminal and, more particularly, to a mobile terminal capable of sensing a touch input, and a control method thereof.

2. Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

On the strength of the improvement, a terminal may display icons on a display unit. However, with an executed screen of an application displayed on a display unit, it is difficult to execute a different application. Namely, executing of a different application requires a complicated manipulation.

SUMMARY

As aspect of the present invention provides a mobile terminal capable of enhancing user convenience in displaying a function execution icon, and a control method thereof.

To achieve these and other advantages and in accordance with the purpose of the present invention, as embodied and broadly described herein, the present invention provides in one aspect a mobile terminal including: a display unit configured to display screen information; a sensing unit configured to sense a touch input applied to the display unit; and a controller configured to display an indicator bar including at least one icon together with the screen information, and select any one of icons displayed in the indicator bar.

In an embodiment of the present invention, the controller may display the indicator bar together with the screen information based on a type of the touch input applied to the display unit.

In an embodiment of the present invention, the controller may determine at least one of a shape and a position of the indicator bar according to a type of a multi-touch input applied to the display unit.

In an embodiment of the present invention, the controller may determine an icon included in the indicator bar according to the multi-touch input applied to the display unit.

In an embodiment of the present invention, the mobile terminal may further include a main body, wherein when a first multi-touch input applied to the display unit is sensed, the indicator bar may include icons corresponding to applications previously set in the main body, and when a second multi-touch input different from the first multi-touch input is sensed, the indicator bar may include icons corresponding to applications previously set by the user.

In an embodiment of the present invention, when a first multi-touch input applied to the display unit is sensed, the indicator bar may include icons in relation to an application being executed in a foreground, and when a second multi-touch input different from the first multi-touch input is sensed, the indicator bar may include icons in relation to setting of a function of the main body.

In an embodiment of the present invention, the controller may detect a length of a touch input applied to the display unit, and select any one of icons displayed in the indicator bar.

In an embodiment of the present invention, the controller may display a select cue in one region adjacent to the indicator bar, and change a position of the select cue based on a length of the touch input.

In an embodiment of the present invention, when the touch input is released, the controller may select icons disposed in positions adjacent to the select cue, among icons included in the indicator bar, and execute a function corresponding to the selected icon.

In an embodiment of the present invention, the mobile terminal may further include an audio output unit. The controller may output at least one of an audio signal and a vibration signal through the audio output unit, while changing a position of the select cue.

In an embodiment of the present invention, when a length of the touch input is longer than a pre-set length, the controller may display a scroll bar in the indicator bar and scroll icons displayed in the indicator bar based on a touch input applied to the scroll bar.

In an embodiment of the present invention, the controller may select any one of icons displayed in the indicator bar based on a length of a touch input applied to the display unit in a first direction, and generate a control command in relation to the selected icon based on a touch input in a second direction continued from the touch input in the first direction.

In an embodiment of the present invention, the controller may execute a function corresponding to the selected icon based on attributed information of the touch input in the second direction, or make the selected icon disappear from the indicator bar.

In an embodiment of the present invention, when the touch input in the second direction is sensed, the controller may display different icons in relation to the selected icon on the display unit and, in this case, the controller may determine a number of the related different icons displayed on the display unit based on a length of the touch input in the second direction.

To achieve these and other advantages and in accordance with the purpose of the present invention, as embodied and broadly described herein, the present invention provides in another aspect a control method of a mobile terminal including a display unit configured to display screen information. The control method of a mobile terminal includes: sensing a touch input applied to the display unit; displaying an indicator bar including at least one icon together with the screen information based on attribute information of the sensed touch input; and selecting any one of icons displayed in the indicator bar.

In an embodiment of the present invention, the displaying of the indicator bar including at least one icon together with the screen information based on the attributed information of the sensed touch input may be displaying the indicator bar together with the screen information based on a type of the touch input applied to the display unit.

In an embodiment of the present invention, the selecting of any one of icons displayed in the indicator bar may include: detecting a length of the touch input applied to the display unit; and selecting any one of the icons displayed in the indicator bar based on the length of the touch input.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
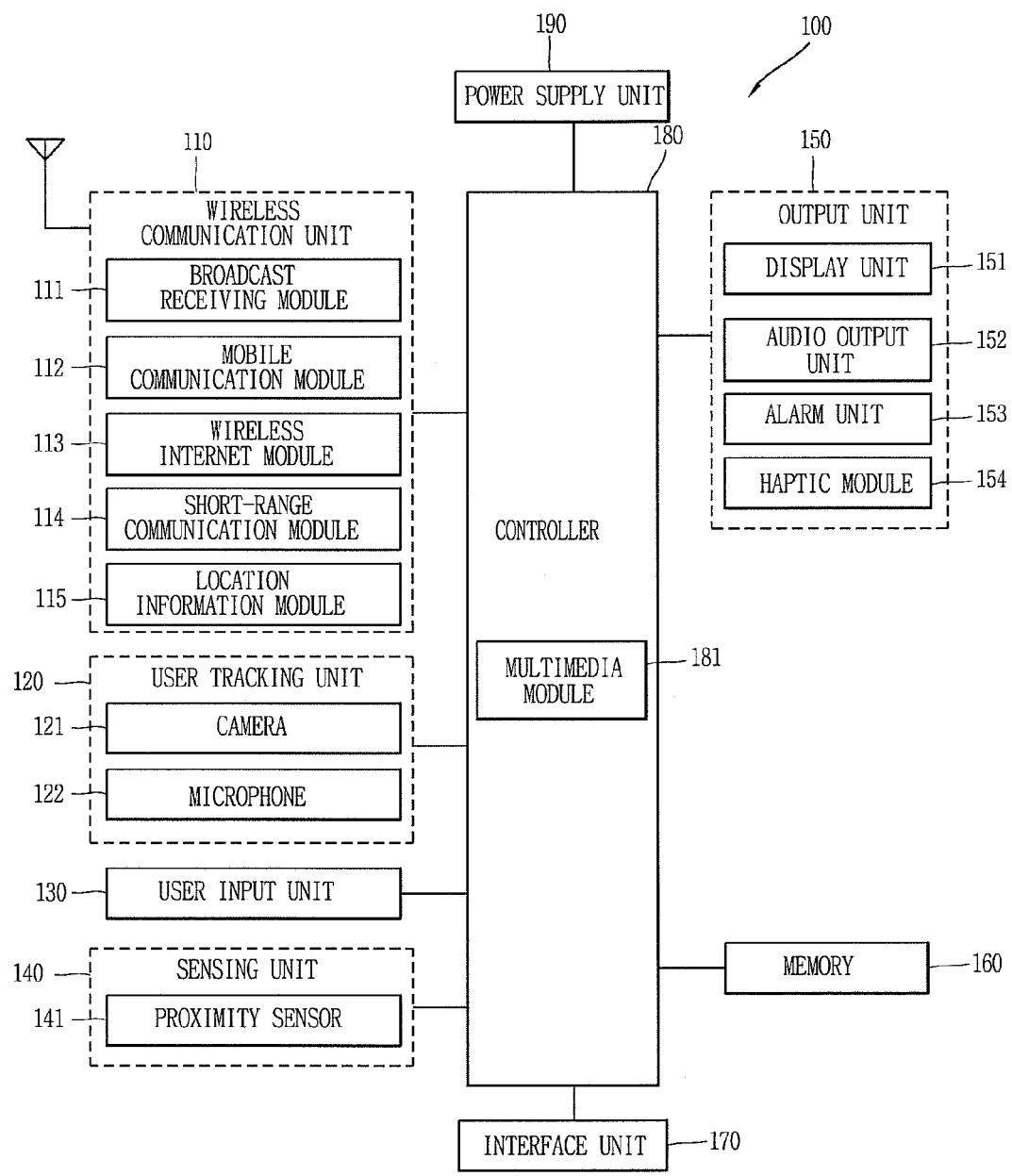
FIG. 1 is a block diagram of a mobile terminal according to an embodiment of the present invention.

FIG. 1 is a block diagram of a mobile terminal 100 according to an embodiment of the present invention. With reference to FIG. 1, the mobile terminal 100 includes a wireless communication unit 110, an A/V (Audio/Video) input unit (referred to as a 'user tracking unit', hereinafter) 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

Hereinafter, the elements 110 to 190 of the mobile terminal 100 will be described in detail as follows.

The wireless communication unit 110 typically includes one or more modules allowing for radio communication between the mobile terminal 100 and a wireless communication system or between the mobile terminal 100 and a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal, and a server. Such radio signals may include a voice call signal, a video call signal or various types of data according to text and/or multimedia message transmission and/or reception.

The wireless Internet module 113 supports wireless Internet access for the mobile terminal 100. This module may be internally or externally coupled to the mobile terminal 100. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location of the mobile terminal 100. A typical example of the location information module is a GPS (Global Positioning System).

With reference to FIG. 1, the A/V input unit 120 may include a camera 121 and a microphone 122. The camera 121 processes image frames of still pictures or video obtained by an image sensor in a video capturing mode or an image capturing mode. The image frames processed by the camera 121 may be displayed on a display unit 151. The processed image frames may be stored in the memory 160 or transmitted to the outside via the wireless communication unit 110. Two or more cameras 121 may be provided according to a usage environment.

The microphone 122 may process an audio signal input from an external source into electrical voice data in a phone call mode, a recording mode, a voice recognition mode, and the like. The audio (voice) data processed by the microphone 122 may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. Also, the sensing unit 140 may include a touch sensor (not shown) for sensing a touch operation with respect to the display unit 151.

The touch sensor may have a form of a touch film, a touch sheet, a touch pad, and the like. The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When the touch sensor and the display unit 151 are overlaid in a layered manner, the display unit 151 may function as both an input device and an output device. Such a display unit 151 may also be called a 'touch screen'.

When there is a touch input through the touch screen, a corresponding signal (signals) are transmitted to a touch controller. The touch controller processes the signals transmitted from the touch sensor and transmits corresponding data to the controller 180. Accordingly, the controller 180 may recognize which portion of the display unit 151 has been touched.

When the touch screen is an electrostatic type touch screen, the touch screen may detect proximity of a select cue based on a change in an electric field according to the proximity of the select cue. Such a touch screen may be classified as a proximity sensor 141.

The proximity sensor 141 is a sensor for detecting the presence or absence of a select cue by using the force of electromagnetism or infrared rays without a physical contact. Thus, the proximity sensor 141 has a considerably longer life span compared with a contact type sensor, and it can be utilized for various purposes. Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like.

In the following description, for the sake of explanation, recognition of a select cue to be sensed positioned to be close to the touch screen will be called a 'proximity touch', while recognition of actual contacting of a select cue to be sensed on the touch screen will be called a 'contact touch'.

The proximity sensor 141 senses a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view a select cue positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. A video signal or an audio signal may also be output through the display unit 151 or the audio output module 152, so the display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a method of processing a user input with respect to the mobile terminal 100 will be described.

The user input unit 130 is manipulated to receive a command for controlling the operation of the mobile terminal 100 and may include a plurality of manipulation units. The manipulation units may be generally referred to as a manipulating portion, and various methods and techniques can be employed for the manipulation portion so long as they can be operated by the user in a tactile manner.

Various types of visual information may be displayed on the display unit 151. The information may be displayed in the form of character, number, symbol, graphic, icon, etc. In order to input the information, at least one of the character, number, symbol, graphic and icon is displayed in a certain arrangement so as to be implemented in the form of a keypad. Such keypad may be so-called 'soft key'.

The display unit 151 may be operated as a whole region or may be divided into a plurality of regions and accordingly operated. In the latter case, the plurality of regions may be operation in association with each other. For example, an output window and an input window may be displayed at upper and lower portions of the display unit 151, respectively. The output window and the input window are regions allotted for outputting or inputting information, respectively. Soft keys including numbers for inputting a phone number, or the like, may be outputted to the input window. When the soft key is touched, a number corresponding to the touched soft key is displayed on the output window. When the manipulation unit is manipulated, a call connection with respect to a phone number displayed on the output window is attempted, or text displayed on the output window may be input to an application.

The display unit 151 or the touch pad may be configured to sense touch scrolling. The user may move a cursor or a pointer positioned on an entity, e.g., an icon or the like, displayed on the display unit 151 by scrolling the display unit 151 or the touch pad. In addition, when the user moves his fingers on the display unit 151 or the touch pad, a path along which the user's fingers move may be visually displayed on the display unit 151. This may be useful in editing an image displayed on the display unit 151.

One function of the terminal may be executed in case where the display unit 151 and the touch pad are touched together within a certain time range. The both touches may be clamping the terminal body with the user's thumb and index finger. The one function executed in this case may be, for example, activation or deactivation of the display unit 151 or the touch pad.

Figure 2A:
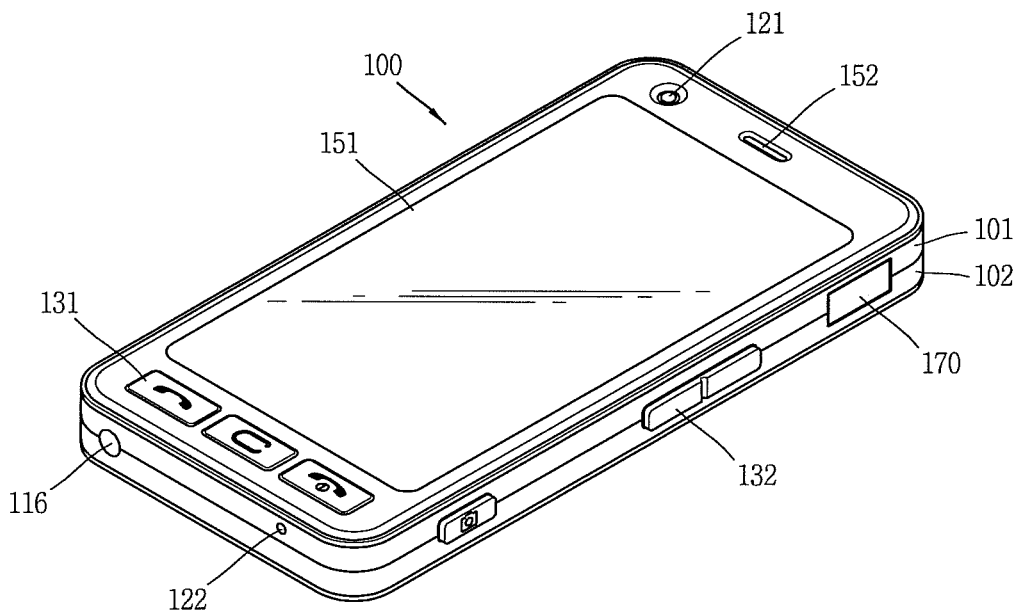
FIGS. 2A and 2B are perspective views illustrating the exterior of the mobile terminal according to an embodiment of the present invention.
Figure 2B:
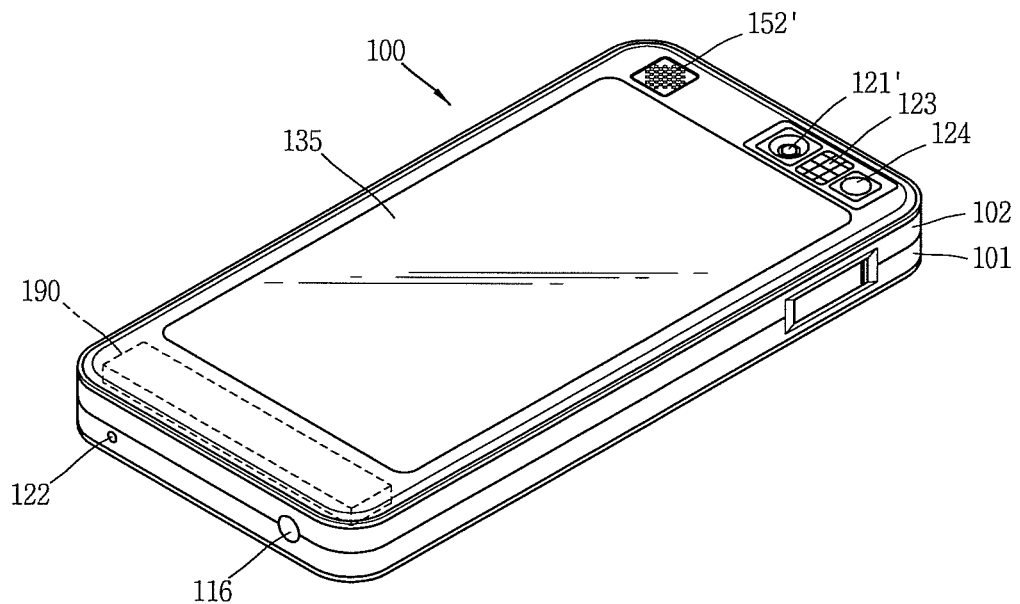

FIGS. 2A and 2B are perspective views showing an external appearance of the mobile terminal 100 according to an embodiment of the present invention. Specifically, FIG. 2A shows a front surface and one lateral surface of the mobile terminal 100, and FIG. 2B shows a rear surface and another lateral surface of the mobile terminal 100.

With reference to FIG. 2A, the mobile terminal 100 has a bar type terminal body. However, without being limited thereto, the present invention may also be applicable to a slide type mobile terminal, a folder type mobile terminal, a swing type mobile terminal, a swivel type mobile terminal, and the like, in which two or more bodies are coupled to be movable relatively.

The terminal body includes a case (or casing, housing, cover, etc.) constituting an external appearance of the terminal body. The case may be divided into a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, and the user input unit 130 (see FIG. 1), the microphone 122, the interface 170, and the like, may be located on the terminal body, namely, mainly, on the front case 101.

The display unit 151 occupies the most portion of the front surface of the front case 101. The audio output module 152 and the camera 121 are disposed at a region adjacent to one end portion of the display unit 151, and a first user input unit 131 and the microphone 122 are disposed at a region adjacent to the other end portion of the display unit 151. A second user input unit 132 and the interface 170 may be disposed on the sides of the front case 101 and the rear case 102.

The user input unit 130 is manipulated to receive commands for controlling the operation of the mobile terminal 100, and may include a plurality of manipulation units 131 and 132.

The first or second manipulation unit 131 or 132 may receive various commands. For example, the first manipulation unit may receive commands such as start, end, scroll, or the like, and the second manipulation unit 132 may receive commands such as adjustment of size of a sound outputted from the audio output module 152, conversion to a touch recognition mode of the display unit 151, and the like.

With reference to FIG. 2B, a rear camera 121' may additionally be disposed on a rear surface of the terminal body, namely, on the rear case 102. The rear camera 121' may have an image capture direction which is substantially opposite to that of the camera 121 (See FIG. 2A), and may support a different number of pixels (i.e., have a different resolution) than the front camera 121.

For example, the front camera 121 may have a relatively small number of pixels, and the rear camera 121' may have a relatively large number of pixels. Thus, the use of the front camera 121 for a video call can reduce the size of transmission data in case of capturing the user's face and transmitting the captured image to a counterpart in real time. Meanwhile, the rear camera 121' may be used for the purpose of storing a high quality image.

Meanwhile, the cameras 121 and 121' may be installed on the terminal such that they are rotated or popped up.

A flash 123 and a mirror 124 may be additionally disposed adjacent to the camera 121'. When the user captures an image of the subject with the rear camera 121', the flash 123 illuminates the subject. The mirror 124 allows the user to see himself when he wants to capture his own image (i.e., self-image capturing) by using the rear camera 121'.

An audio output unit 152' may be additionally disposed on the rear surface of the terminal body. The rear audio output unit 152' may implement a stereoscopic function along with the audio output module 152 (See FIG. 2A), and may be used for implementing a speaker phone mode during call communication.

A broadcast signal receiving antenna 116 may be additionally disposed on the side of the terminal body in addition to an antenna that supports call communications. The antenna 116 forming a portion of the broadcast reception module 111 (See FIG. 1) may be installed to be drawn out of the terminal body.

A power supply unit 190 for supplying power to the mobile terminal 100 may be installed on the terminal body. The power supply unit 190 may be installed in the terminal body or may be directly detached from the outside of the terminal body.

A touch pad 135 for detecting a touch may be additionally mounted on the rear case 102. Such touch pad may be configured to be light-transmissive like the display unit 151 (See FIG. 2A). Also, a rear display unit may be additionally mounted on the touch pad 135 in order to output visual information. In this case, information output from both of the front display unit 151 and the rear display unit may be controlled by the touch pad 135.

The touch pad 135 is operated in relation to the display unit 151. The touch pad 135 may be disposed to be parallel to the rear side of the display unit 151. The touch pad 135 may have the same size as or smaller than the display unit 151.

Meanwhile, the mobile terminal 100 may display icons on the display unit 151. However, in a state that an executed screen of an application is being displayed on a display unit, it is difficult to execute a different application. Namely, executing of a different application requires a complicated manipulation.

Thus, hereinafter, the mobile terminal 100 capable of enhancing user convenience in displaying a function execution icon and a control method thereof will be described with reference to the accompanying drawings.

Figure 3:
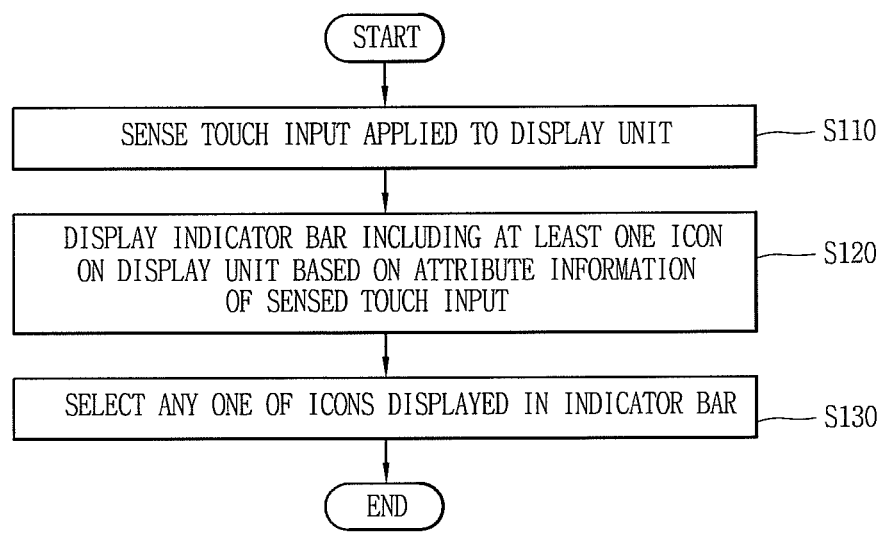
FIG. 3 is a flow chart illustrating an operation of the mobile terminal according to an embodiment of the present invention.

FIG. 3 is a flow chart illustrating an operation of the mobile terminal 100 according to an embodiment of the present invention. The mobile terminal 100 includes the display unit 151 (See FIG. 1), the sensing unit 140 (See FIG. 1), and the controller 180 (See FIG. 1).

Referring to FIG. 3, first, a touch input applied to the display unit is sensed in step S110.

In detail, in a state that screen information is displayed on the display unit 151, the sensing unit 140 may sense a touch input applied to the display unit 151.

The display unit 151 may display screen information regarding at least one of a home screen, a dock screen, a cover flow, a Web page, and an application execution screen.

A touch input may include at least one of a drag input, a flick input, and a slide touch input applied in one direction, and in addition, it may include various types of pre-set touch inputs. Also, the touch input may include a multi-touch input including a plurality of touch points.

Next, an indicator bar including at least one icon is displayed on the display unit 151 based on attribute information of the sensed touch input in step S120.

Here, the indicator bar may include icons for controlling an execution screen displayed on the display unit 151 or include icons in relation to setting of a function of a terminal body.

Also, the indicator bar may include icons corresponding to pre-set applications within the terminal body or may include icons corresponding to applications previously set by the user.

The controller 180 may display the indicator bar including at least one icon on the display unit 151 based on a type of a touch input applied to the display unit 151. For example, only when a multi-touch input including three touch points is sensed on the display unit 151, the controller 180 may display the indicator bar including at least one icon on the display unit 151.

Although not shown, the controller 180 may display the indicator bar including at least one icon on the display unit 151 only when a touch input having a pre-set area or greater applied to the display unit 151 is sensed.

Thereafter, any one of the icons included in the indicator bar is selected in step S130.

The controller 180 may detect a length of a touch input applied to the display unit 151, and select any one of icons displayed in the indicator bar based on a length of the touch input. In detail, when a drag input is applied to the display unit 151, the sensing unit 140 may detect an initiation point of the drag input and a release point of the drag input. Based on the initiation point and the release point of the drag input, the controller 180 may detect a duration of the drag input, a dragged length, a drag input direction, and the like.

Thereafter, based on at least one of the duration of the drag input, the dragged length, and the drag input direction, the controller 180 may select any one of icons included in the indicator bar and execute a function corresponding to the selected icon.

As described above, according to an embodiment of the present invention, an entry path with respect to various applications may be provided by a unified touch gesture. Also, based on a length of a touch input, at least any one of a plurality of applications may be selected, and thus, a number of manipulations by the user required for selecting an application can be reduced. As a result, user convenience can be enhanced.

Figure 4:
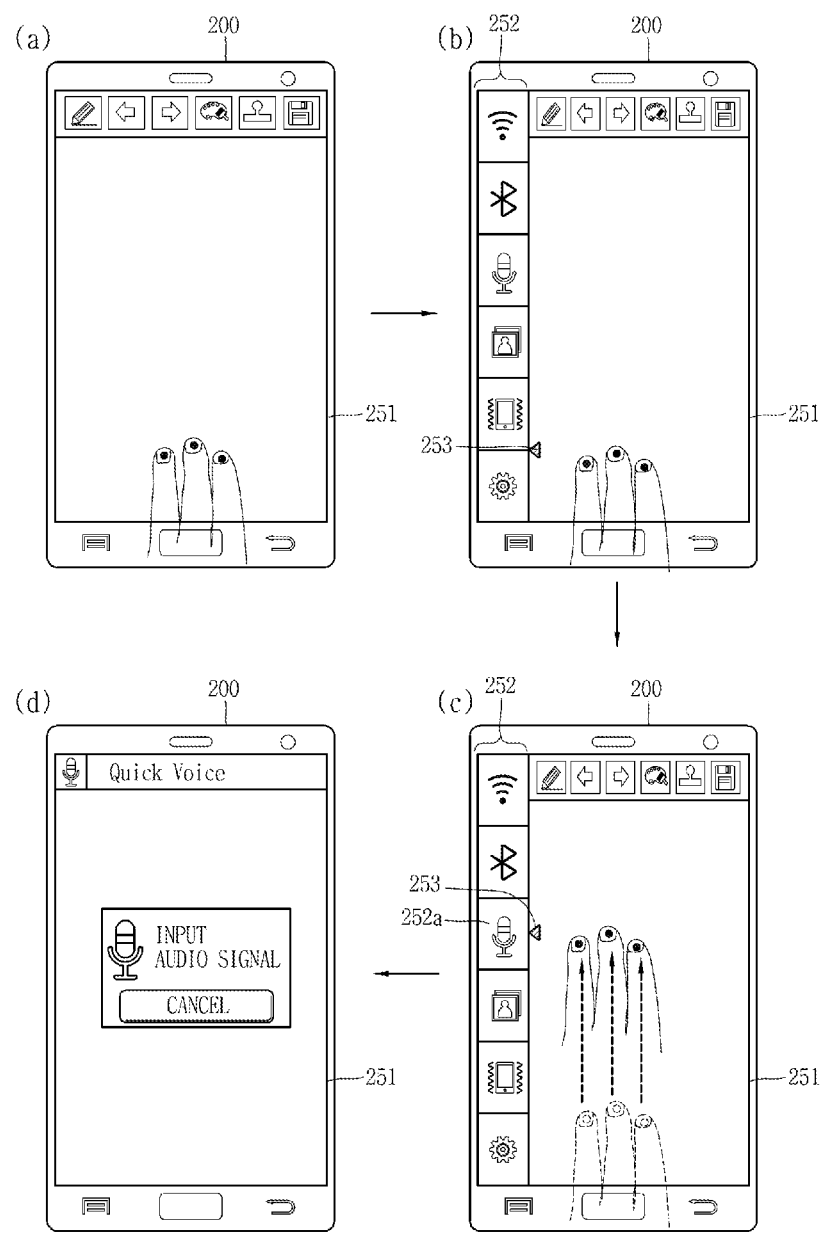
FIGS. 4 to 14 are conceptual views illustrating operational examples of the mobile terminal of FIG. 3.

FIG. 4 is a conceptual view illustrating an operation example of the mobile terminal 100 (See FIG. 1) according to FIG. 3. The mobile terminal 100 includes the display unit 251, the sensing unit 140 (See FIG. 1), and the controller 180 (See FIG. 1).

Referring to FIG. 4(*a*), the display unit 251 may display screen information, e.g., an execution screen of a notebook application. Here, a touch input may be applied to the display unit 251.

The controller 180 may discriminate a type of a sensed touch input. In detail, the controller 180 may determine whether the sensed touch input corresponds to a pre-set touch input, e.g., a multi-touch input including three touch points.

When the sensed touch input corresponds to a multi-touch input including three touch points, referring to FIG. 4(*b*), the controller 180 may display an indicator bar 252 including at least one icon on the display unit 251.

Here, a select cue 253 may be displayed in a region adjacent to the indicator bar 252. In detail, as illustrated, the select cue 253 may be displayed to be adjacent to an icon disposed in the same line as a touch point among the icons included in the indicator bar 252.

Meanwhile, referring to FIG. 4(*c*), when a drag input is sensed, the controller 180 may detect a length of the drag input. The controller 180 may move a position of the select cue 253 based on a length of the drag input. In detail, the controller 180 may move a position of the select cue 253 by a length of the drag input. Meanwhile, the controller 180 may move the position of the select cue 253 by a ratio of a length of the drag input over the length of the entire screen, i.e., by a ratio of a length of the drag input over the entire screen.

Here, although not shown, the controller 180 may output at least one of an audio signal and a vibration signal through the audio output unit 152 (See FIG. 1), while moving the position of the select cue 253.

Figure 6:
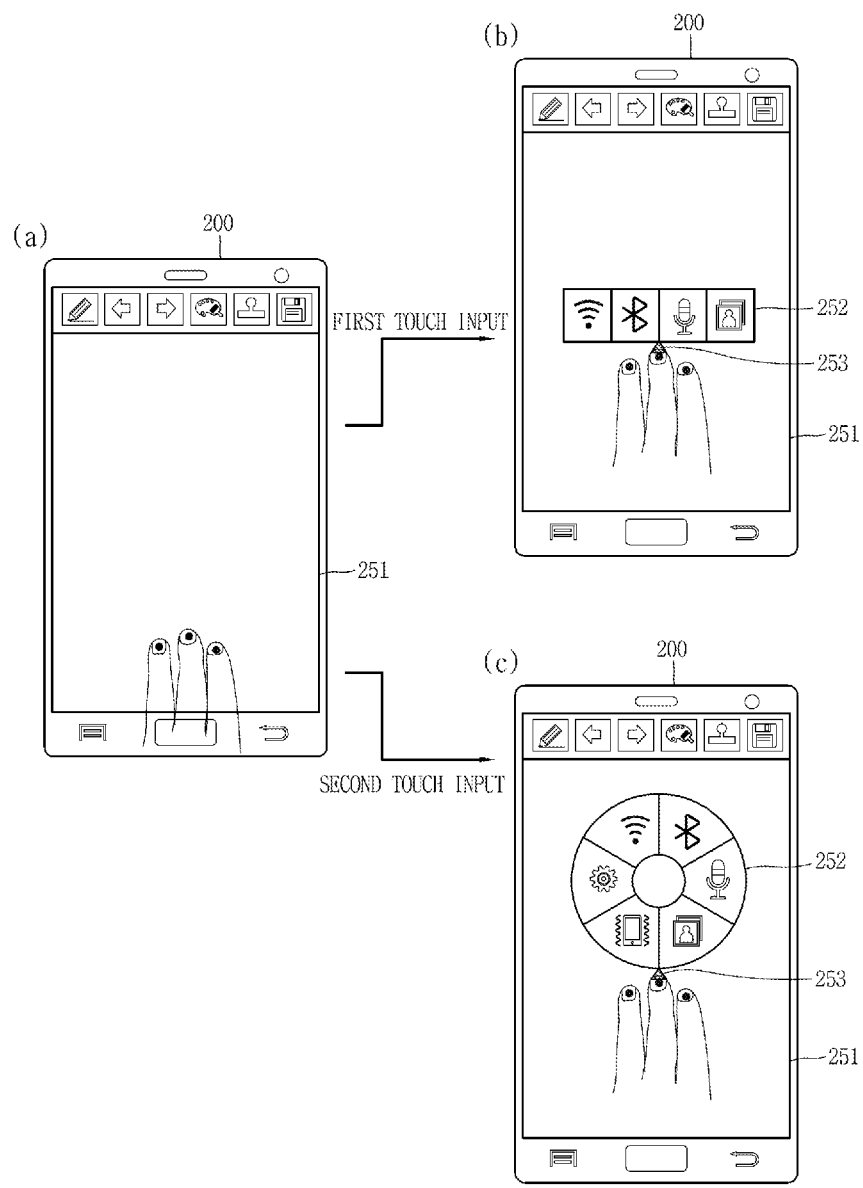

Thereafter, when the drag input is released, as shown in FIG. 6(*d*), the controller 180 may select an icon 252*a* disposed in a position adjacent to the select cue 253 among the icons included in the indicator bar 252. The controller 180 may execute a function corresponding to the selected icon 252*a*. Accordingly, as illustrated, the controller 180 may display an execution screen of a quick voice application on the display unit 251, while executing the quick voice application.

Figure 5:
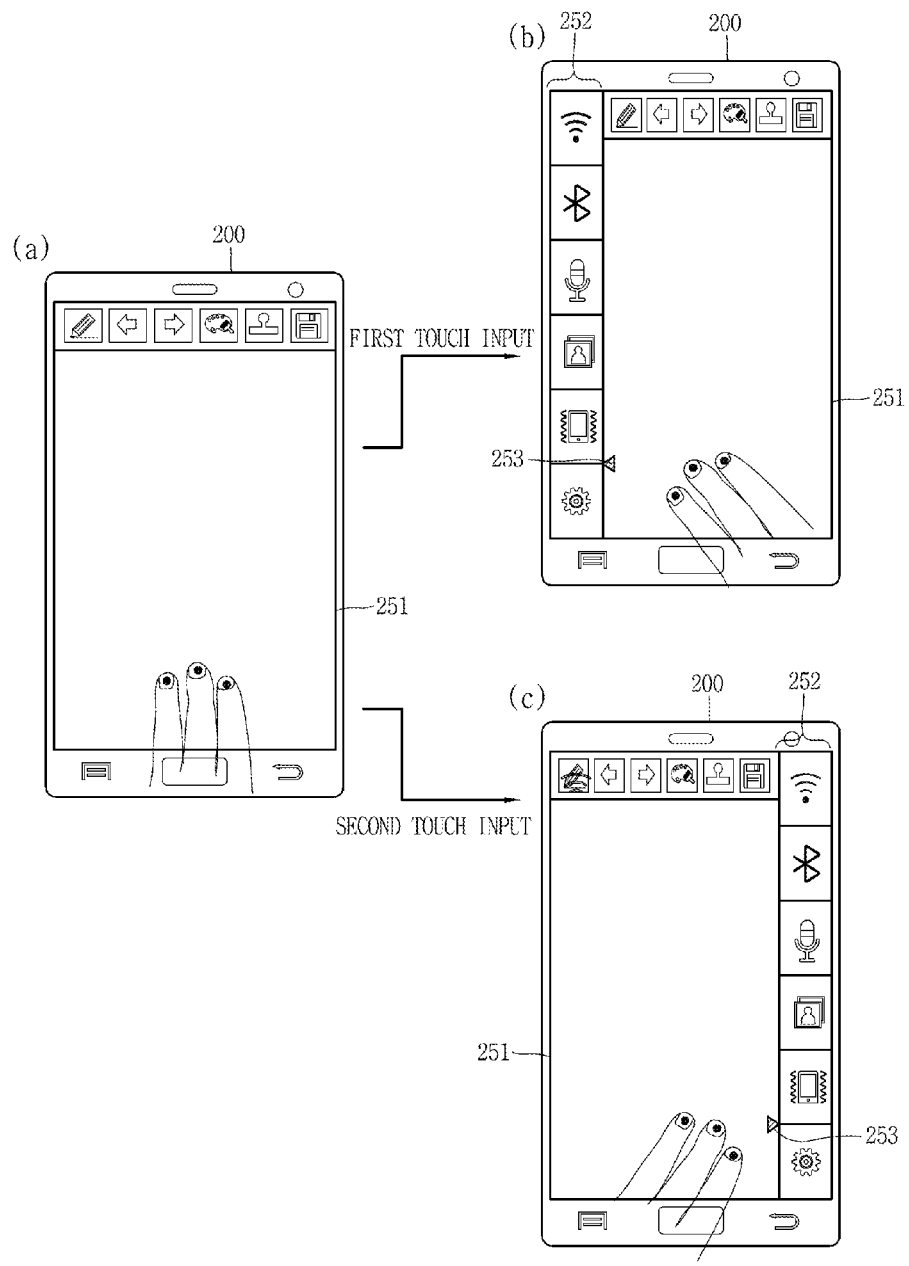

FIGS. 5 and 6 are conceptual views illustrating an operation example of the mobile terminal 100 (See FIG. 1) according to FIG. 3. The mobile terminal 100 includes the display unit 251, the sensing unit 140 (See FIG. 1), and the controller 180 (See FIG. 1).

The controller 180 may detect at least one of a type of a touch input and a direction of the touch input, as attribute information of the touch input applied to the display unit 251. The controller 180 may determine a position of the indicator bar 252 according to the detected attribute information of the touch input.

In detail, referring to FIGS. 5(*a*) and 5(*b*), the display unit 251 may display screen information, e.g., an execution screen of a notebook application. Here, when a first touch input applied to the display unit 251 is sensed, for example, when a touch input sloped leftwardly by a pre-set angle is sensed, the controller 180 may display the indicator bar 252 including at least one icon in the left portion of the execution screen of the notebook application.

Meanwhile, referring to FIGS. 5(*a*) and 5(*c*), when a second touch input, different from the first touch input, applied to the display unit 251 is sensed, for example, when a touch input sloped rightwardly by a pre-set angle is sensed, the controller 180 may display the indicator bar 252 in a right portion of the execution screen of the notebook application.

Although not shown, the controller 180 may display the indicator bar 252 in an upper end or a lower end of the execution screen of the notebook application according to the detected attribute information of the touch input.

Meanwhile, the controller 180 may determine a shape of the indicator bar 252 according to the detected attributed information of the touch input.

In detail, referring to FIGS. 6(*a*) and 6(*b*), the display unit 251 may display screen information, e.g., an execution screen of the notebook application. Here, when a first touch input applied to the display unit 251 is sensed, the controller 180 may display the indicator bar 252 in which icons are horizontally arranged in a point at which the first touch input was sensed. Accordingly, the select cue 253 may be displayed in the point at which the first touch input was sensed. The controller 180 may move the select cue 253 according to a movement of the first touch input.

Meanwhile, the indicator bar 252 may be displayed to overlap on an execution screen of the notebook application. The controller 180 may adjust a degree of transparency of the indicator bar 252. For example, the controller 180 may adjust a degree of transparency of the indicator bar 252 based on a different touch input applied to the display unit 251, or adjust a degree of transparency of the indicator bar 252 based on an input applied to a side up key or a side down key provided on the side of the terminal body.

Meanwhile, referring to FIGS. 6(a) and 6(c), when a second touch input, different from the first touch input, applied to the display unit 251 is sensed, the controller 180 may display the indicator bar 252 in which icons are arranged in a circular shape at a point in which the second touch input was sensed. In this case, a position of any one of the icons included in the indictor bar 252 and the select cue 253 based on the continued second touch input.

Thereafter, when the second touch input is released, the controller 180 may select an icon disposed in a position adjacent to the select cue 253 among icons included in the indicator bar 252, and execute a function corresponding to the selected icon.

Figure 7:
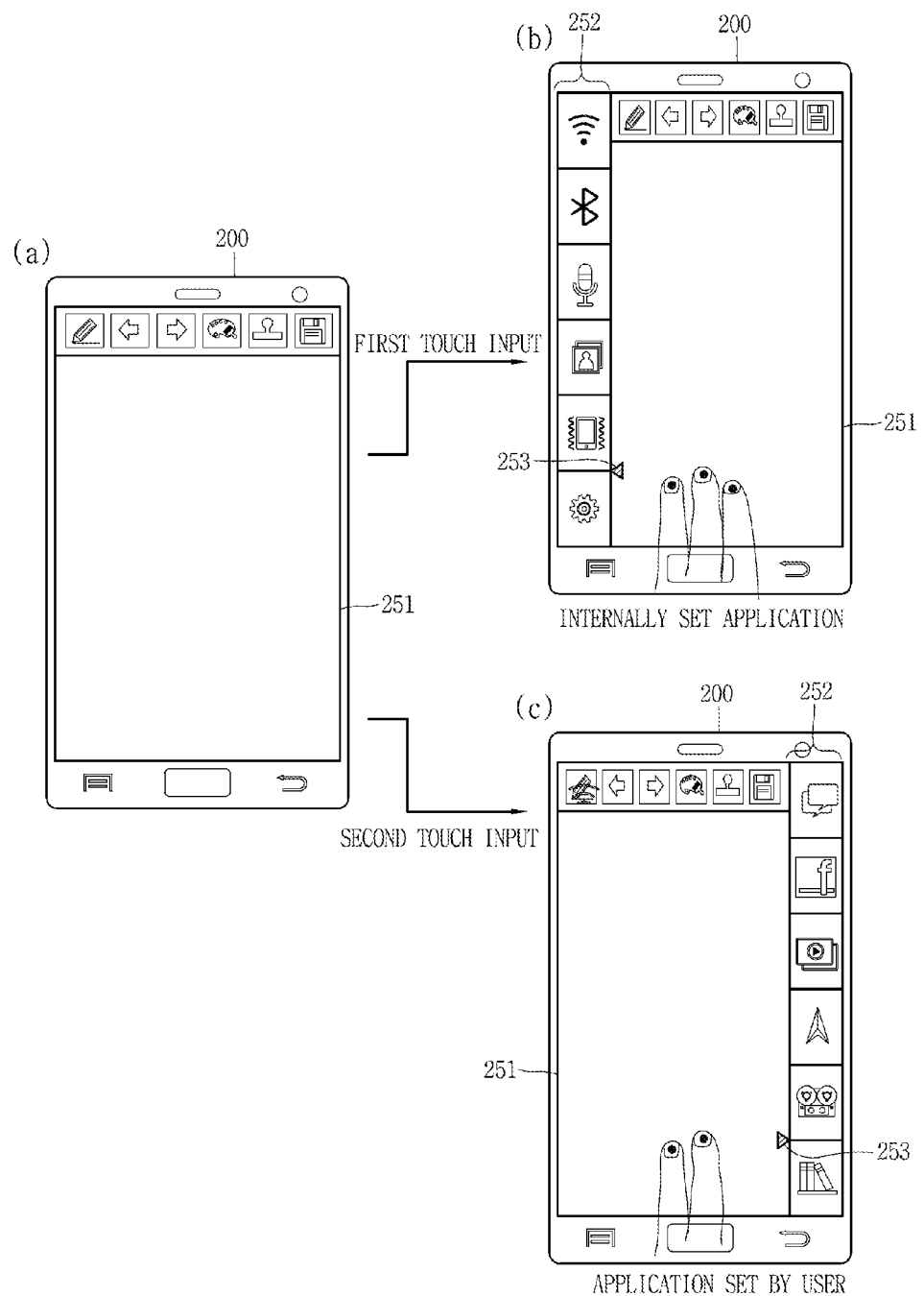
Figure 8:
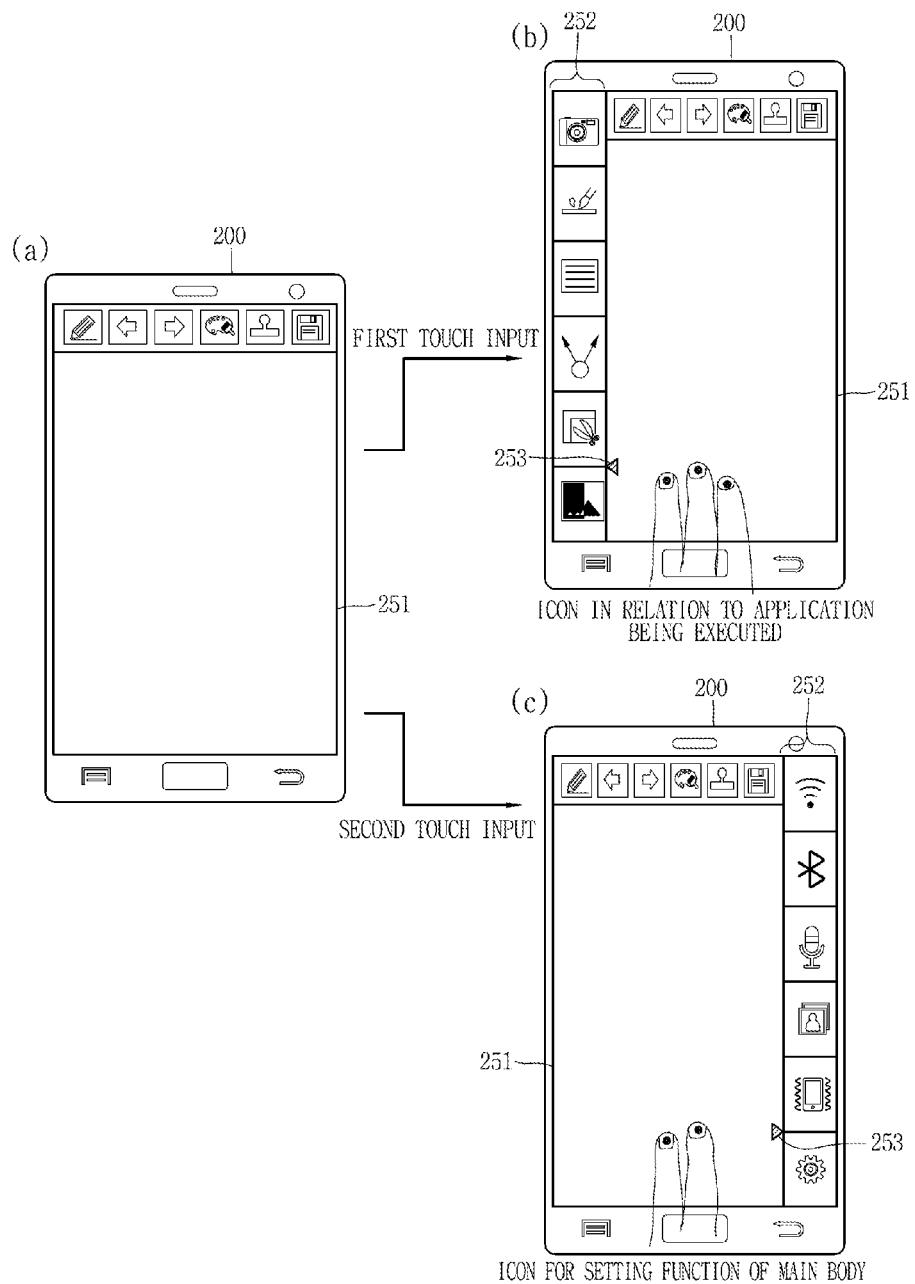

FIGS. 7 and 8 are conceptual views illustrating an operation example of the mobile terminal 100 (See FIG. 1) according to FIG. 3. The mobile terminal 100 includes the display unit 251, the sensing unit 140 (See FIG. 1), and the controller 180 (See FIG. 1).

The controller 180 may detect a type of a touch input as attribute information of a touch input applied to the display unit 251. The controller 180 may determine an icon included in the indicator bar 252 according to the detected type of the touch input.

In detail, referring to FIG. 7, the controller 180 may determine whether to display icons corresponding to pre-set applications within the terminal body in the indicator bar 252 or whether to display icons corresponding to applications set by the user in the indicator bar 252.

In more detail, referring to FIGS. 7(a) and 7(b), the display unit 251 may display screen information, e.g., an execution screen of a notebook application. Here, when a first touch input, e.g., a multi-touch input including three touch points, applied to the display unit 251 is sensed, the controller 180 may display the indicator bar 252 including icons corresponding to pre-set applications within the terminal body.

Here, the pre-set applications within the terminal body may be applications set by developers during a manufacturing process of the mobile terminal 100, may be applications randomly selected by the controller 180, or may be applications selected by the controller 180 in consideration of use frequency of the user.

Meanwhile, referring to FIGS. 7(a) and 7(c), when a second touch input, e.g., a multi-touch input including two touch points, different from the first touch input, applied to the display unit 251 is sensed, the controller 180 may display the indicator bar 252 including icons corresponding to the applications set by the user.

To this end, the user may select an application to be included in the indicator bar 252 from an application setting screen, or may select a method for disposing icons corresponding to the respective applications.

Meanwhile, referring to FIG. 8, the controller 180 may determine whether to display icons in relation to a currently executed application in the indicator bar 252 or whether to display icons in relation to a setting of a function of the terminal body according to a detected type of touch input.

In more detail, referring to FIGS. 8(a) and 8(b), in a state that an execution screen of the notebook application is displayed, when a first touch input, e.g., a multi-touch input including three touch points, applied to the display unit 251 is sensed, the controller 180 may display the indicator bar including the icons in relation to the notebook application.

Accordingly, as illustrated, the indicator bar 252 may include an image pickup icon, a shared icon, a crop icon, or the like.

Meanwhile, referring to FIGS. 8(a) and 8(c), when a second touch input, e.g., a multi-touch input including two touch points, different from the first touch input, applied to the display unit 251 is sensed, the controller 180 may display the indicator bar 252 including icons in relation to setting of a function of the terminal body.

Accordingly, as illustrated, a Wi-Fi execution icon, a Bluetooth execution icon, a vibration icon, and the like, may be included in the indicator bar 252.

Figure 9:
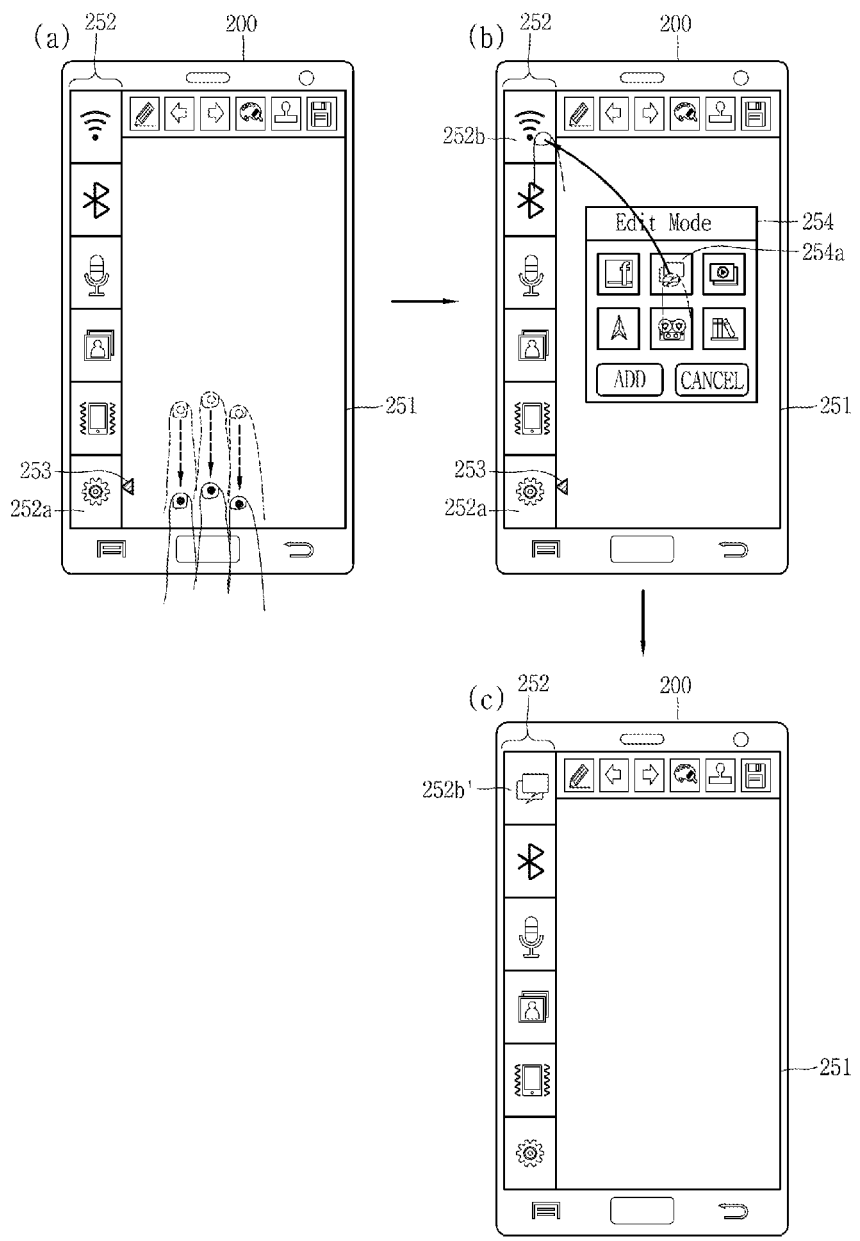

FIG. 9 is a conceptual view illustrating an operation example of the mobile terminal 100 (See FIG. 1) according to FIG. 3. The mobile terminal 100 includes the display unit 251, the sensing unit 140 (See FIG. 1), and the controller 180 (See FIG. 1).

Referring to FIG. 9(a), when a touch input, e.g., a multi-drag input including three touch points, applied to the display unit 251 is sensed, the controller 180 may detect a direction of the drag input and a length of the drag input.

As illustrated, the controller may move a position of the select cue 253 based on the direction of the drag input and the length of the drag input. When the drag input is performed downwardly of the screen, the select cue 253 may be displayed to be adjacent to an icon 252a positioned in a lower portion of the screen.

Thereafter, when the drag input is released, as illustrated in FIG. 8(b), the controller 180 may select the icon 252a disposed in the position adjacent to the select cue 253 among the icons included in the indicator bar 252. The controller 180 may execute a function corresponding to the selected icon 252a, e.g., an editing mode of the icon. Accordingly, as illustrated, the controller 180 may display a pop-up window 254 for editing the icon.

Icons to be added to the indicator bar 252 may be displayed in the pop-up window 254. Here, any one of the icons included in the pop-up window 254, for example, an icon 254a corresponding to a message application, is dragged toward any one of the icons included in the indicator bar 252, for example, toward a Wi-Fi execution icon 252b, as illustrated in FIG. 8(c), the icons included in the indicator bar 252 may be changed.

Namely, the controller 180 may make the Wi-Fi execution icon 252a disappear, and display an icon 254a corresponding to a message application in the position instead.

Figure 10:
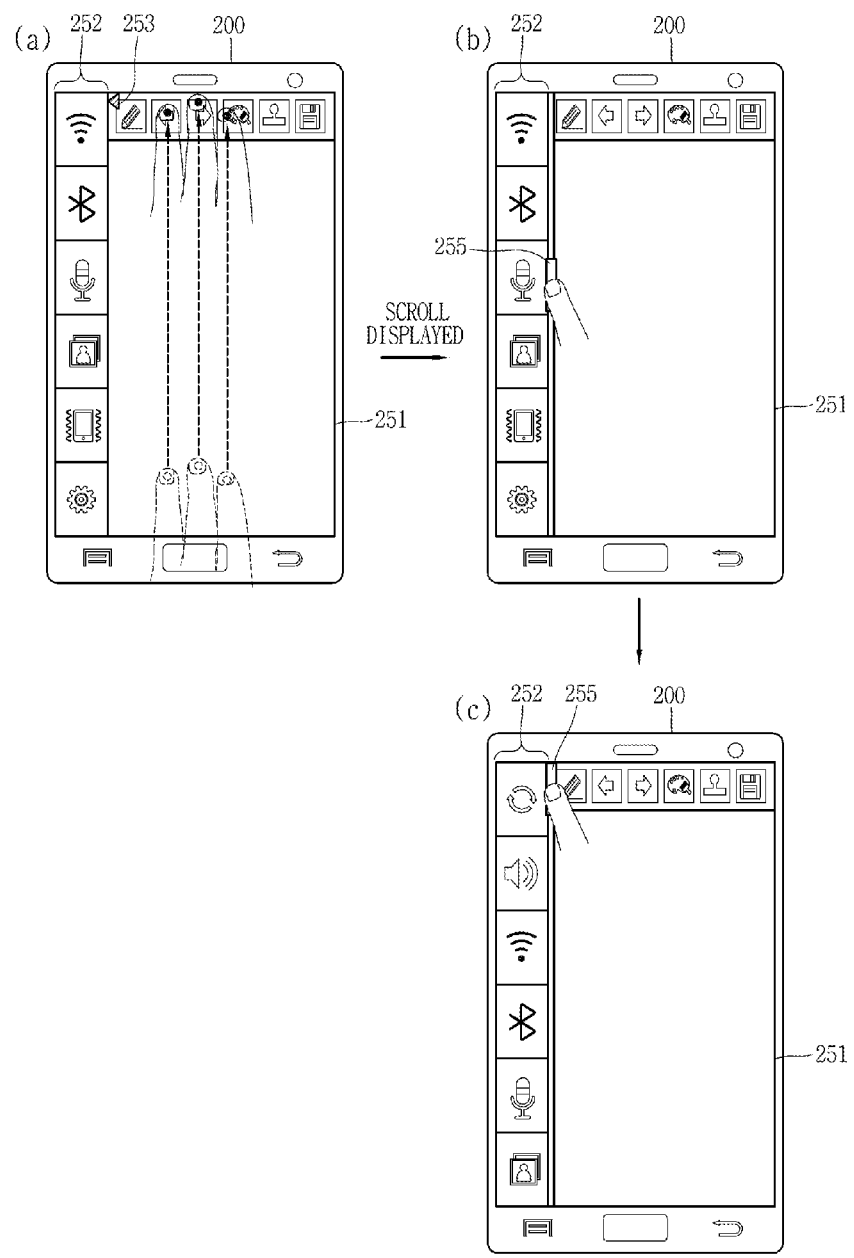

FIG. 10 is a conceptual view illustrating an operation example of the mobile terminal 100 (See FIG. 1) according to FIG. 3. The mobile terminal 100 includes the display unit 251, the sensing unit 140 (See FIG. 1), and the controller 180 (See FIG. 1).

Referring to FIG. 10(a), when a length of a touch input applied to the display unit 251 is equal to or greater than a pre-set length, as illustrated in FIG. 10(b), the controller may display a scroll bar 255 in the indicator bar 252. Namely, in case that a multi-drag input including three touch points applied to the display unit 251 is sensed and the drag input continues to the uppermost end or lowermost end of the screen, the controller 180 may display the scroll bar 255 in the indicator bar 252.

Thereafter, when a touch input applied to the scroll bar 255 is sensed, the controller 180 may scroll the indicator bar 252. Here, scrolling may refer to shifting the entirety of information up and down or left and right when an amount of information included in a page exceeds an amount of one screen. As illustrated in FIG. 10(c), as scrolling is performed, the icons displayed in the indicator bar 252 may be changed.

Figure 11:
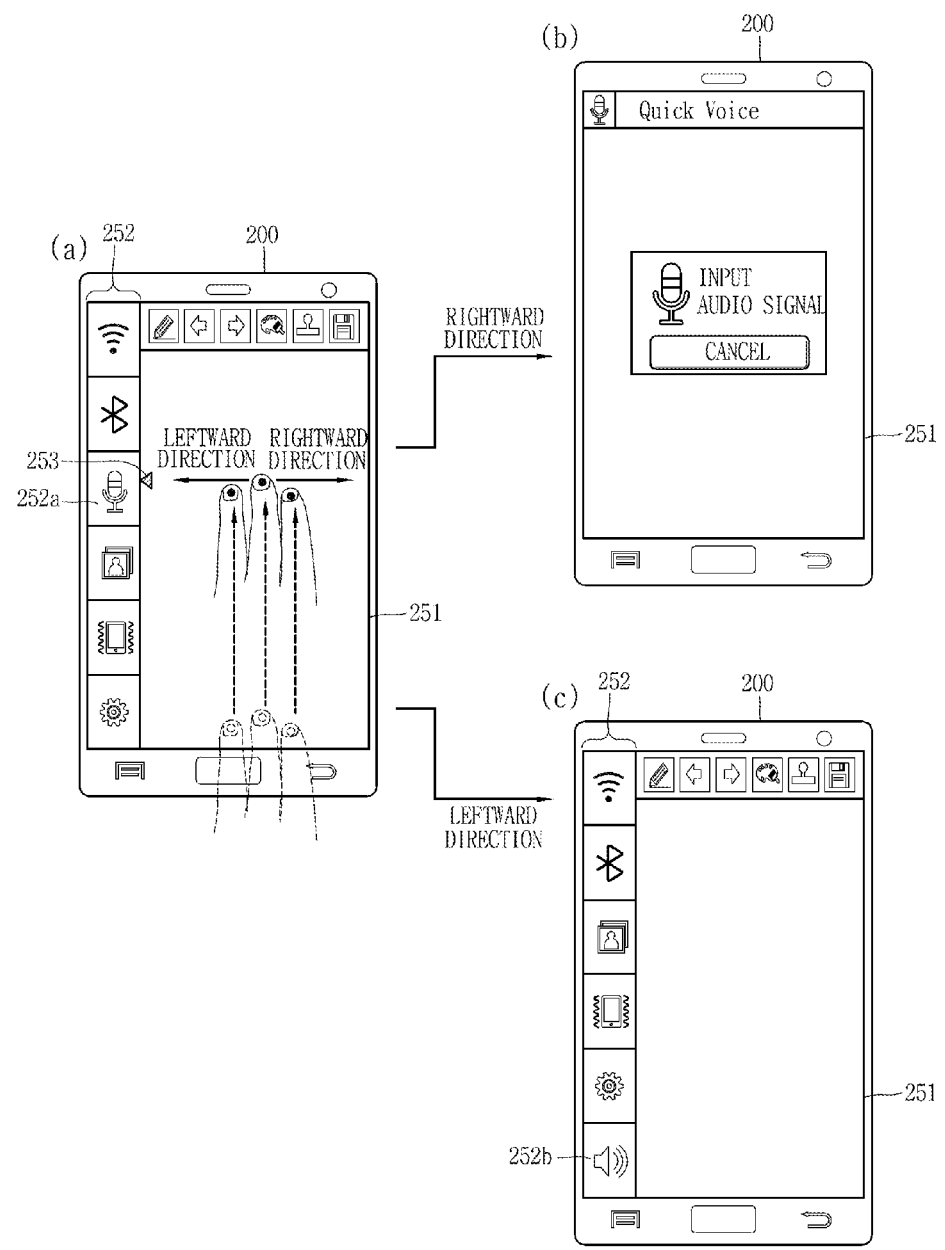
Figure 12:
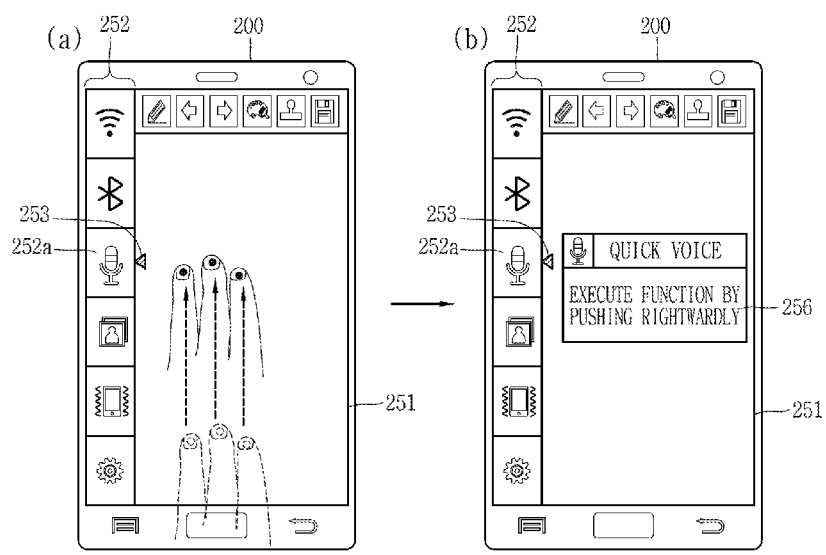
Figure 13:
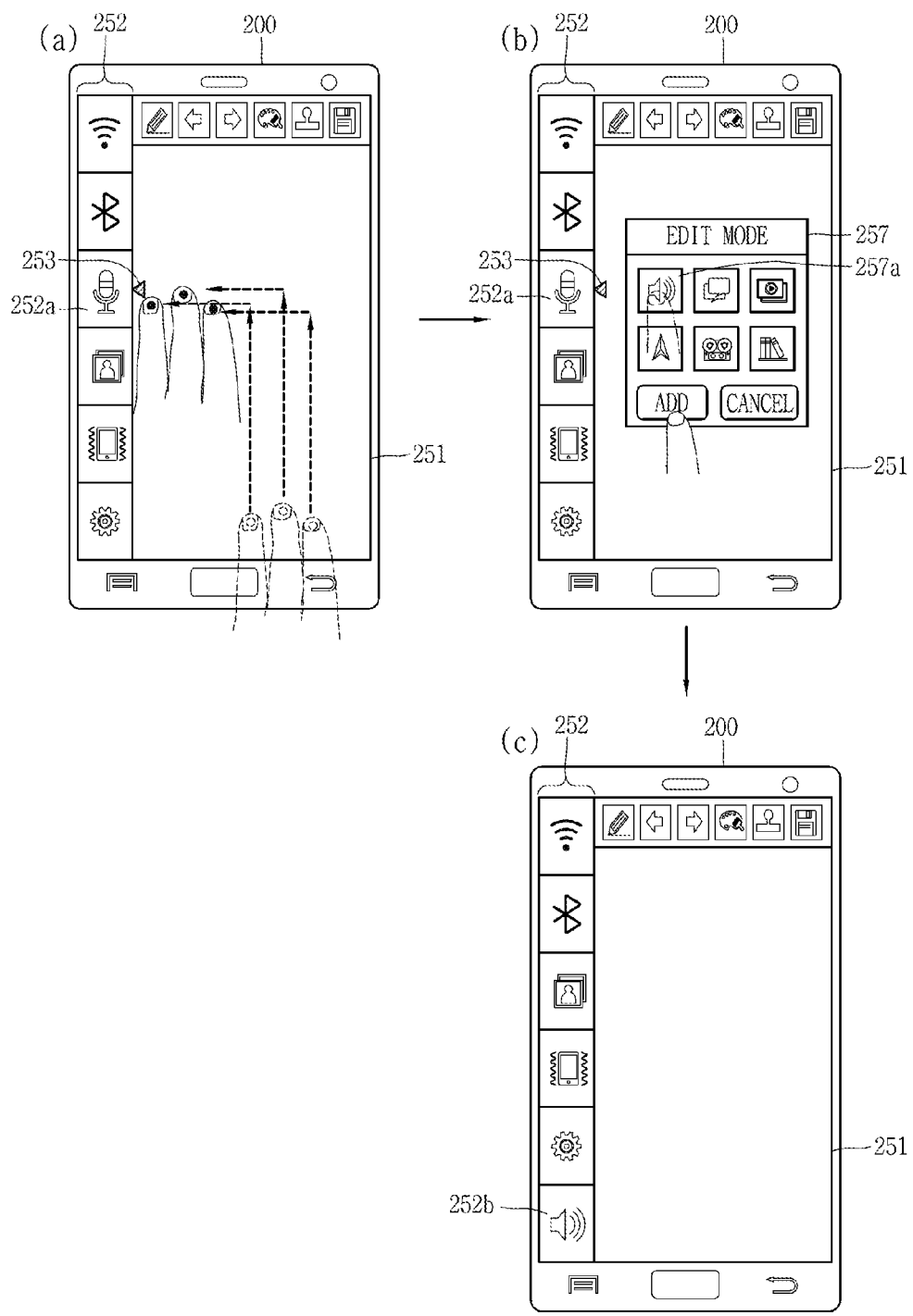

FIGS. 11 to 13 are conceptual views illustrating an operation example of the mobile terminal 100 (See FIG. 1) according to FIG. 3. The mobile terminal 100 includes the display unit 251, the sensing unit 140 (See FIG. 1), and the controller 180 (See FIG. 1).

As described above with reference to FIG. 4, the controller 180 may select any one of icons included in the indicator bar 252 based on a touch input applied to the display unit 251 in a first direction.

However, when a touch input in a second direction continued from the touch input in the first direction is sensed, the controller 180 may generate a control command in relation to an icon selected in response to the touch input in the second direction.

In detail, referring to FIG. 11(a), when a touch input in the first direction from the lower end toward the upper end of the screen, e.g., a multi-drag input including three touch points, is sensed, the controller 180 may select an icon 252a disposed in a position adjacent to the select cue 253 among the icons included in the indicator bar 252.

Next, as illustrated in FIG. 11(b), when a touch input in a rightward direction continued from the touch input in the first direction is sensed, the controller 180 may execute a function corresponding to the selected icon 252a. Accordingly, as illustrated, the controller 180 may display an execution screen of a quick voice application on the display unit 251, while executing the quick voice application.

Meanwhile, as illustrated in FIGS. 12(a) and 12(b), the controller 180 may display a pop-up window 256 including content inducing the user to apply a touch input in the rightward direction continued from the touch input in the first direction on the display unit 251.

Meanwhile, as illustrated in FIG. 11(b), when a touch input in a leftward direction continued from the touch input in the first direction is sensed, the controller 180 may make the selected icon 252a disappear from the indicator bar 252. As the selected icon 252a disappears, the controller 180 may select an icon to be newly included in the indicator bar 252.

Here, the icon to be newly included in the indicator bar 252 may be selected according to priority information of icons or may be selected by the user. Hereinafter, a process of selecting an icon by the user will be described in detail with reference to FIG. 13.

Referring to FIGS. 13(a) and 13(b), when a touch input in the leftward direction continued from the touch input in the first direction is sensed, the controller 180 may display a pop-up window 257 for selecting an icon to be newly included in the indicator bar 252.

Icons to be added to the indicator bar 252 may be displayed in the pop-up window 257. Here, any one, e.g., a volume adjustment icon 257a, is selected from the icons included in the pop-up window 257, as illustrated in FIG. 13(c), the selected icon (icon corresponding to the quick voice application) 252a disappears from the indicator bar 252 and the volume adjustment icon 252b may be added thereto.

Figure 14:
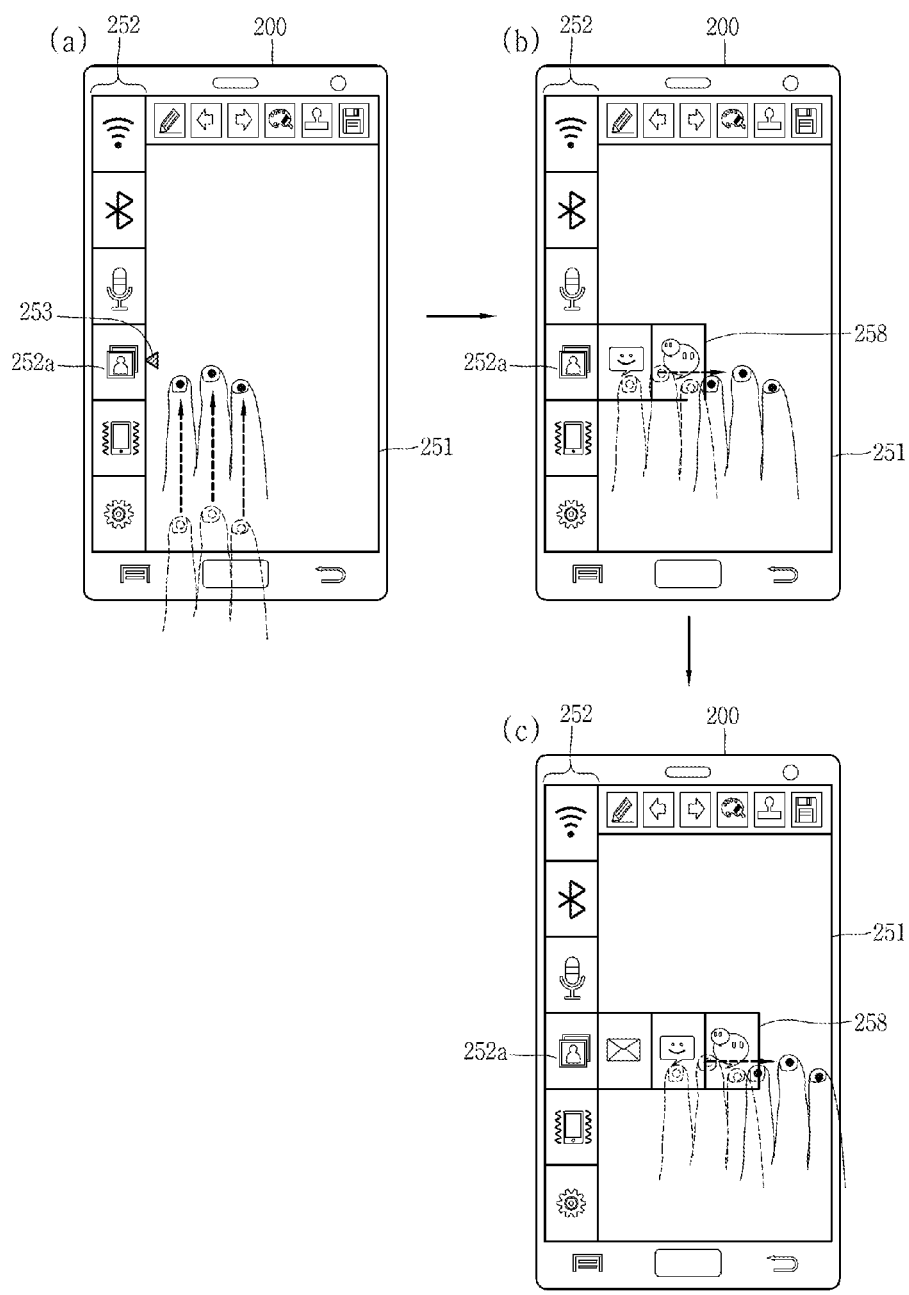

FIG. 14 is a conceptual view illustrating an operation example of the mobile terminal 100 (See FIG. 1) according to FIG. 3. The mobile terminal 100 includes the display unit 251, the sensing unit 140 (See FIG. 1), and the controller 180 (See FIG. 1).

As described above with reference to FIG. 4, the controller 180 may select any one of icons included in the indicator bar 252 based on a touch input applied to the display unit 251 in a first direction.

However, when a touch input in a second direction continued from the touch input in the first direction is sensed, the controller 180 may display different icons in relation to the selected icon on the display unit 251. Here, the controller 110 may determine a number of the relevant different icons displayed on the display unit 251 based on a length of the touch input in the second direction.

In detail, referring to FIG. 14(a), when a touch input in the first direction from the lower end toward the upper end of the screen, e.g., a multi-drag input including three touch points, is sensed, the controller 180 may select an icon, e.g., a contact number icon 252a, disposed in a position adjacent to the select cue 253 among the icons included in the indicator bar 252.

Next, as illustrated in FIGS. 14(a) and 14(b), when a touch input in a rightward direction continued from the touch input in the first direction is sensed, the controller 180 may display different icons 258 in relation to the contact number icon 252a on the display unit 251.

To this end, the controller 180 may detect a length of the touch input in the rightward direction. Based on the detected length of the touch input, the controller 180 may determine a number of the relevant icons 258 to be displayed on the display unit 251. Namely, as the length of the touch input is lengthened, the number of the relevant icons 258 displayed on the display unit 251 may be increased.

Meanwhile, here, the relevant icons 258 may be icons corresponding to applications whose functions may be performed by using the contact number information, which may include an icon corresponding to an e-mail application, an icon corresponding to a text message application, an icon corresponding to a messenger application, and the like.

Figure 15:
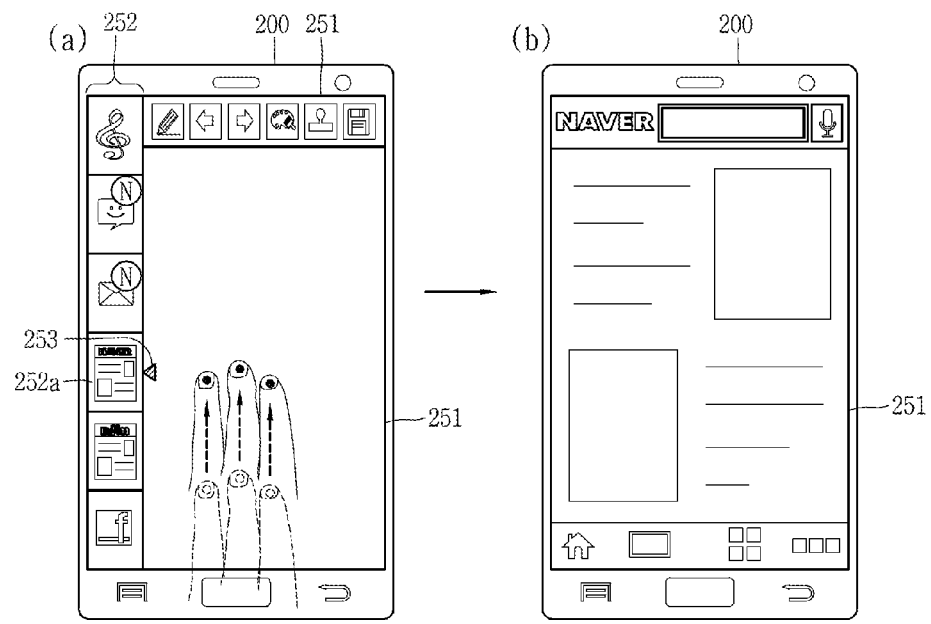
FIGS. 15 to 17 are conceptual views illustrating user interfaces to which the operational example of the mobile terminal in FIG. 3 is applicable.
Figure 16:
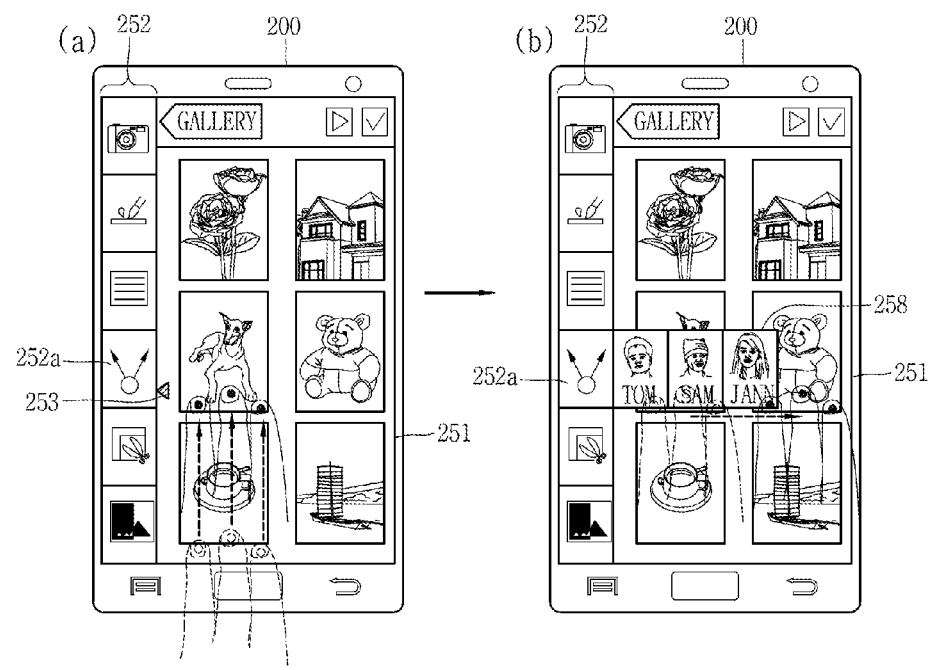
Figure 17:
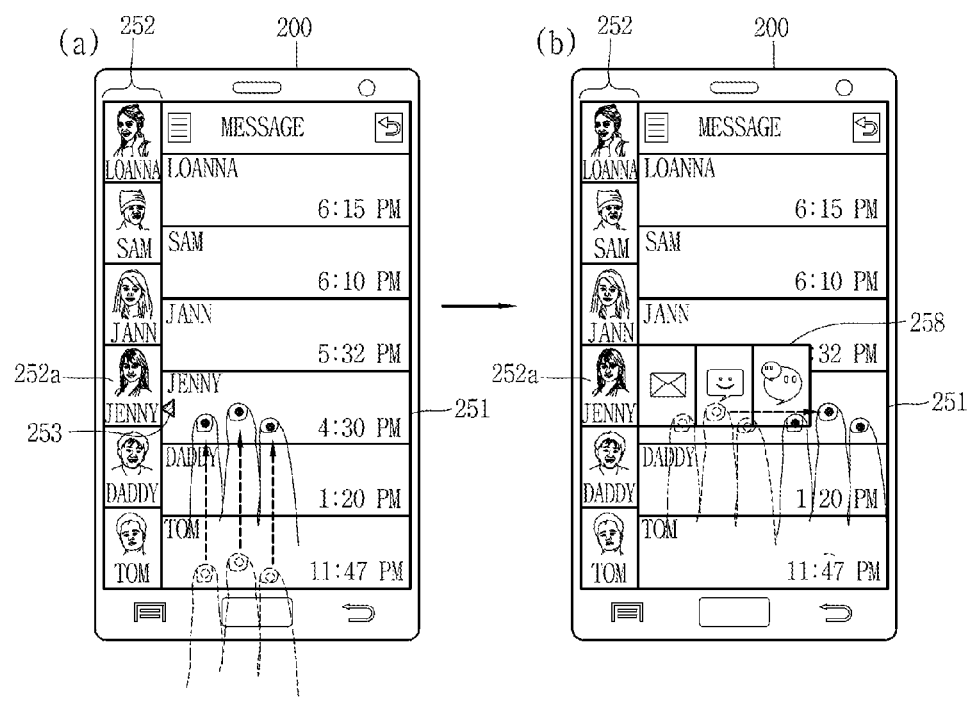

FIGS. 15 to 17 are conceptual views illustrating an operation example of the mobile terminal 100 (See FIG. 1) according to FIG. 3. The mobile terminal 100 includes the display unit 251, the sensing unit 140 (See FIG. 1), and the controller 180 (See FIG. 1).

Referring to FIG. 15(a), the display unit 251 may display an application being executed in a foreground, for example, an execution screen of a notebook application. Here, the controller 180 may display the indicator bar 252 including icons or thumbnail images corresponding to applications being executed in a background.

In this case, when any one 252a of the icons or thumbnail images included in the indicator bar 252 is selected, as illustrated in FIG. 15(b), the controller 180 may display an execution screen of an application corresponding to the selected thumbnail image 252a, for example, an execution screen of a Web site, on the display unit 251.

Referring to FIG. 16(a), the display unit 251 may display an execution screen of a gallery application including a plurality of images. Here, the controller 180 may display the indicator bar 252 including icons in relation to execution of functions using icons or images in relation to controlling of images.

In this case, any one, e.g., a sharing icon 252a, of the icons included in the indicator bar 252 may be selected based on the touch input in the first direction applied to the display unit 251. Subsequently, when a touch input in the second direction continued from the touch input in the first direction is sensed, as illustrated in FIG. 16(b), the controller 180 may display different icons 258 in relation to the sharing icon 252a on the display unit 251.

Here, the relevant icons 258 may include icons corresponding to a plurality of contact number information as a target with which an image is to be shared.

Referring to FIG. 17(a), the display unit 251 may display an execution screen of a message application including a plurality of messages. Here, the controller 180 may display the indicator bar 252 including icons corresponding to a plurality of contact number information as targets to which a message is to be transmitted or from which a message is to be received.

In this case, any one 252a of the contact number icons included in the indicator bar 252 may be selected based on the touch input in the first direction applied to the display unit 251. Subsequently, when a touch input in the second direction continued from the touch input in the first direction is sensed, as illustrated in FIG. 17(b), the controller 180 may display different icons 258 in relation to the selected contact number icon 252a.

Here, the relevant icons 258 may be icons corresponding to applications whose functions are to be performed by using the contact number information, which may include an icon corresponding to an e-mail application, an icon corresponding to a text message application, an icon corresponding to a messenger application, and the like.

Although not shown, the controller may execute a mirroring function (miracast) with respect to a different terminal. Here, the indicator bar 252 displayed in the display unit 251 may include icons corresponding to the respective different terminals. The controller 180 may select at least one different terminal based on a length of the touch input applied to the display unit 251.

In the embodiments of the present invention, the foregoing method may be implemented as codes that can be read by a processor in a program-recorded medium. The processor-readable medium may include any types of recording devices in which data that can be read by a computer system is stored. The computer-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
    a touch screen; and
    a controller configured to:
        display a first indicator bar including a first plurality of icons to a region of the touch screen in response to an initial detection of a first multi-finger touch input applied to the touch screen, wherein a position of the region of the touch screen is determined by a direction of fingertips of the first multi-finger touch input with respect to the touch screen,
        display a visual cue adjacent to the first indicator bar while the first indicator bar is displayed on the touch screen,
        move a position of the visual cue when a continuous drag of the first multi-finger touch input is detected on the touch screen,
        select an icon disposed in a position adjacent to the visual cue in response to a removal of the continuous drag of the first multi-finger touch input, and
        display a second indicator bar, different from the first indicator bar and including a second plurality of icons, on another region different from the region of the touch screen in response to an initial detection of a second multi-finger touch input applied to the touch screen, wherein a total number of fingers used in the second multi-finger touch input is different from a total number of fingers used in the first multi-finger touch input, and
        wherein the first plurality of icons on said first indicator bar corresponds to applications previously set in the mobile terminal and the second plurality of icons on said second indicator bar corresponds to applications previously set by the user.

2. The mobile terminal of claim 1, wherein the controller determines a shape of the first indicator bar according to a type of the first multi-finger touch input applied to the touch screen.

3. The mobile terminal of claim 1, wherein the controller determines at least one icon included in first plurality of icons included in the first indicator bar according to a type of the first multi-finger touch input applied to the touch screen.

4. The mobile terminal of claim 1, wherein the controller detects a distance of the first multi-finger touch input traveled during the continuous drag to determine the position of the visual cue.

5. The mobile terminal of claim 1, wherein when the first multi-finger touch input is released, the controller executes a function corresponding to the selected icon.

6. The mobile terminal of claim 1, further comprising: an audio output unit, wherein the controller outputs at least one of an audio signal and a vibration signal through the audio output unit, during the continuous drag of the first multi-finger touch input.

7. The mobile terminal of claim 4, wherein when the distance of the first multi-finger touch input is longer than a pre-set length, the controller displays a scroll bar on the touch screen and displays scroll icons in the first indicator bar based on a touch input applied to the scroll bar.

8. The mobile terminal of claim 4, wherein the controller selects any one of the first plurality of icons displayed at the first indicator bar based on the distance of the first multi-finger touch input and the controller generates a control command in relation to the selected icon based on a touch input continued from the first touch input and in a direction different from a direction of the first multi-finger touch input.

9. The mobile terminal of claim 8, wherein the controller executes a function corresponding to the selected icon based on an attribute of the touch input.

10. The mobile terminal of claim 8, wherein when the touch input in the direction is sensed, the controller displays different icons in relation to the selected icon on the touch screen.

11. A control method of a mobile terminal including a touch screen, the method comprising:
    sensing a first multi-finger touch input applied to the touch screen;
    displaying a first indicator bar including a first plurality of icons to a region of the touch screen in response to an initial detection of a first multi-finger touch input applied to the touch screen, wherein a position of the region on the touch screen is determined by a direction of fingertips of the first multi-finger touch input with respect to the touch screen;

displaying a visual cue adjacent to the first indicator bar while the first indicator bar is displayed at the touch screen;

moving a position of the visual cue when a continuous drag of the first multi-touch input is detected on the touch screen;

selecting an icon disposed in a position adjacent to the visual cue in response to a removal of the continuous drag of the first multi-finger touch inputs and displaying a second indicator bar, different from the first indicator bar and including a second plurality of icons, on another region different from the region of the touch screen in response to an initial detection of a second multi-finger touch input applied to the touch screen, wherein a total number of fingers used in the second multi-finger touch input is different from a total number of fingers used in the first multi-finger touch input, and wherein the first plurality of icons on said first indicator bar corresponds to applications previously set in the mobile terminal and the second plurality of icons on said second indicator bar corresponds to applications previously set by the user.

12. The control method of claim 11, wherein the selecting of the icon comprises:

detecting a distance of the first multi-finger touch input traveled during the continuous drag; and selecting the icon disposed in a position most adjacent to the visual cue based on the distance of the first multi-finger touch input traveled during the continuous drag.

* * * * *